(12) United States Patent
Kyllonen

(10) Patent No.: US 10,581,844 B2
(45) Date of Patent: Mar. 3, 2020

(54) SYSTEM AND METHOD FOR ACCESS AUTHENTICATION

(71) Applicant: UTC Fire & Security Corporation, Farmington, CT (US)

(72) Inventor: Kimmo A. Kyllonen, Shakopee, MN (US)

(73) Assignee: UTC Fire & Security Corporation, Farmington, CT (US)

( * ) Notice: Subject to any disclaimer, the term of this patent is extended or adjusted under 35 U.S.C. 154(b) by 116 days.

(21) Appl. No.: 15/507,519

(22) PCT Filed: Aug. 31, 2015

(86) PCT No.: PCT/US2015/047737
§ 371 (c)(1),
(2) Date: Feb. 28, 2017

(87) PCT Pub. No.: WO2016/036661
PCT Pub. Date: Mar. 10, 2016

(65) Prior Publication Data
US 2017/0289147 A1      Oct. 5, 2017

Related U.S. Application Data

(60) Provisional application No. 62/046,620, filed on Sep. 5, 2014.

(51) Int. Cl.
*H04L 29/06* (2006.01)
*G06F 16/583* (2019.01)
(Continued)

(52) U.S. Cl.
CPC ........ *H04L 63/0861* (2013.01); *G06F 16/583* (2019.01); *G06F 16/951* (2019.01);
(Continued)

(58) Field of Classification Search
CPC .. H04L 63/0861; H04W 12/06; H04W 12/08; G06F 21/32
See application file for complete search history.

(56) References Cited

U.S. PATENT DOCUMENTS 4,757,534 A * 7/1988 Matyas ............... G06F 12/1408
380/281
5,606,614 A * 2/1997 Brady .................. G06Q 20/341
235/380

(Continued)

FOREIGN PATENT DOCUMENTS

| CN | 103795540 A | 5/2014 |
|---|---|---|
| EP | 2709031 A1 | 3/2014 |
| WO | WO-2012139270 A1 | 10/2012 |

OTHER PUBLICATIONS

Ho, Grant, et al. "Smart locks: Lessons for securing commodity internet of things devices." Proceedings of the 11th ACM on Asia conference on computer and communications security. (pp. 461-472). ACM, 2016. (Year: 2016).*

(Continued)

*Primary Examiner* — Kari L Schmidt
(74) *Attorney, Agent, or Firm* — Locke Lord LLP; Scott D. Wofsy; Judy R. Naamat

(57) ABSTRACT

A method for access authentication includes receiving a facial recognition picture from a mobile electronic apparatus of a user. The facial recognition picture is compared to a stored facial recognition picture of the user. If a positive match exists, an authorization key is transmitted to a locking mechanism. The stored facial recognition picture can include a picture stored on a picture database populated by each transmitted facial recognition picture. In certain embodiments, the facial recognition picture can be retrieved from on a social media account.

9 Claims, 2 Drawing Sheets

(51) Int. Cl.
*G06F 16/951* (2019.01)
*H04W 12/06* (2009.01)
*H04W 12/08* (2009.01)
*G06F 21/32* (2013.01)
*G06K 9/00* (2006.01)

(52) U.S. Cl.
CPC ......... *G06F 21/32* (2013.01); *G06K 9/00228* (2013.01); *G06K 9/00288* (2013.01); *H04L 63/10* (2013.01); *H04W 12/06* (2013.01); *H04W 12/08* (2013.01)

(56) References Cited

U.S. PATENT DOCUMENTS

| | | | | |
|---|---|---|---|---|
| 6,484,260 | B1* | 11/2002 | Scott | G06F 21/32 713/182 |
| 7,437,567 | B2* | 10/2008 | Hollingshead | G06Q 20/10 713/186 |
| 7,552,333 | B2* | 6/2009 | Wheeler | G06F 21/32 380/282 |
| 8,495,382 | B2* | 7/2013 | Johnson | G06F 21/32 713/186 |
| 8,577,810 | B1* | 11/2013 | Dalit | G06F 21/32 705/1.1 |
| 8,752,145 | B1* | 6/2014 | Dotan | H04L 63/0861 340/5.2 |
| 9,501,881 | B2* | 11/2016 | Saeedi | G07C 9/00087 |
| 2003/0217276 | A1* | 11/2003 | LaCous | G06F 21/32 713/186 |
| 2006/0222211 | A1* | 10/2006 | Olivo, Jr. | G06K 9/00885 382/115 |
| 2008/0209545 | A1* | 8/2008 | Asano | H04L 9/3273 726/19 |
| 2012/0081282 | A1* | 4/2012 | Chin | G06F 3/011 345/156 |
| 2012/0118947 | A1* | 5/2012 | Lyons | G07F 17/3241 235/375 |
| 2012/0230539 | A1* | 9/2012 | Calman | G06Q 10/06 382/103 |
| 2012/0280783 | A1* | 11/2012 | Gerhardt | G07C 9/00309 340/5.6 |
| 2013/0214898 | A1* | 8/2013 | Pineau | G06F 21/32 340/5.6 |
| 2013/0265450 | A1* | 10/2013 | Barnes, Jr. | H04N 5/77 348/207.1 |
| 2013/0333010 | A1* | 12/2013 | Chougle | G06F 21/46 726/7 |
| 2014/0002236 | A1* | 1/2014 | Pineau | G06F 21/32 340/5.6 |
| 2014/0250522 | A1 | 9/2014 | Wang et al. | |
| 2014/0337948 | A1* | 11/2014 | Hoyos | H04L 63/0861 726/7 |
| 2014/0358954 | A1* | 12/2014 | Kocher | G10K 11/346 707/758 |
| 2016/0260271 | A1* | 9/2016 | Belhadia | G06F 21/32 |
| 2017/0053467 | A1* | 2/2017 | Meganck | G07C 9/00039 |
| 2017/0243425 | A1* | 8/2017 | Meganck | E05B 47/0615 |
| 2018/0108192 | A1* | 4/2018 | Ho | H04L 12/282 |
| 2019/0066415 | A1* | 2/2019 | Pang | G07C 9/00087 |
| 2019/0304227 | A1* | 10/2019 | Chen | G07C 9/00309 |

OTHER PUBLICATIONS

N. Saparkhojayev, A. Dauitbayeva, A. Nurtayev and G. Baimenshina, "NFC-enabled access control and management system," 2014 International Conference on Web and Open Access to Learning (ICWOAL), Dubai, 2014, pp. 1-4. (Year: 2014).*

Internatioanl Search Report for Interntional Application No. PCT/US2015/047737, dated Nov. 5, 2015.

First Office Action from the Chinese Patent Office for Chinese Patent Application No. CN201580047572.8, dated Jul. 16, 2019.

* cited by examiner

SYSTEM AND METHOD FOR ACCESS AUTHENTICATION

CROSS REFERENCE TO RELATED APPLICATIONS

This application is a 371 U.S. National Phase of International PCT Patent Application No. PCT/US2015/047737, filed Aug. 31, 2015, which claims the benefit of and priority to U.S. Provisional Patent Application No. 62/046,620 filed Sep. 5, 2014, the content of which is expressly incorporated by reference herein in its entirety.

BACKGROUND OF THE INVENTION

Field of the Invention

The present disclosure relates to electronic security, and more particularly to granting access based on facial biometrics.

Description of Related Art

In the past, access to certain areas, whether buildings, rooms or other places was generally controlled by a human guard standing outside the restricted area, or through the use of physical keys, lock combinations, swipe cards and/or access codes. Guards can be expensive, potentially corruptible and can be ineffective due to human factors. Problems with physical keys, swipe cards and other forms of physical access devices include the fact that they can be damaged, lost, forgotten, stolen, given to others or copied. The problem with lock combinations and access codes is that they too can be stolen or told to others. There is no guarantee that the person using the keys or codes is a person authorized to use them.

To overcome some of the foregoing problems, some systems require multiple modes of authentication, for example in terms of an additional access code, radio frequency identification (RFID) tag, swipe card, flash card or the like, to confirm that the person requesting access is authorized. However, as before, such credentials can be damaged, lost, forgotten or stolen. The credentials also add to the costs. Quite often the two sets of credentials come from different suppliers and there may be problems linking them together and can cost more to maintain as a result.

Such conventional methods and systems have generally been considered satisfactory for their intended purpose. However, there is still a need in the art for improved systems and methods for access authentication. The present disclosure provides a solution for this need.

SUMMARY OF THE INVENTION

A method for access authentication includes receiving a facial recognition picture from a mobile electronic apparatus of a user. The facial recognition picture is compared to a stored facial recognition picture of the user. If a positive match exists, an authorization key is transmitted to a locking mechanism. The stored facial recognition picture can include a picture stored on a picture database populated by each transmitted facial recognition picture. In certain embodiments, the facial recognition picture can be recovered from a social media account and stored on the picture database. The method can further include receiving a screen gesture from the mobile electronic apparatus of a user and/or receiving a personal identification number from the mobile electronic apparatus of the user.

An access authentication system comprises a processor operatively connected to a memory. The memory includes instructions recorded thereon that, when read by the processor, cause the processor to receive a facial recognition picture from a mobile electronic apparatus of a user. The processor compares the facial recognition picture to a stored facial recognition picture of the user and transmits an authorization key to a locking mechanism upon authentication of the facial recognition picture.

In certain embodiments, a method for access authentication comprises receiving a facial recognition picture from a user to gain entry to a restricted area. The facial recognition picture is then compared to a stored facial recognition picture. An authorization key is transmitted to a locking mechanism if a positive match exits between the facial recognition picture and the stored facial recognition picture to allow the user to gain access to the restricted area.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
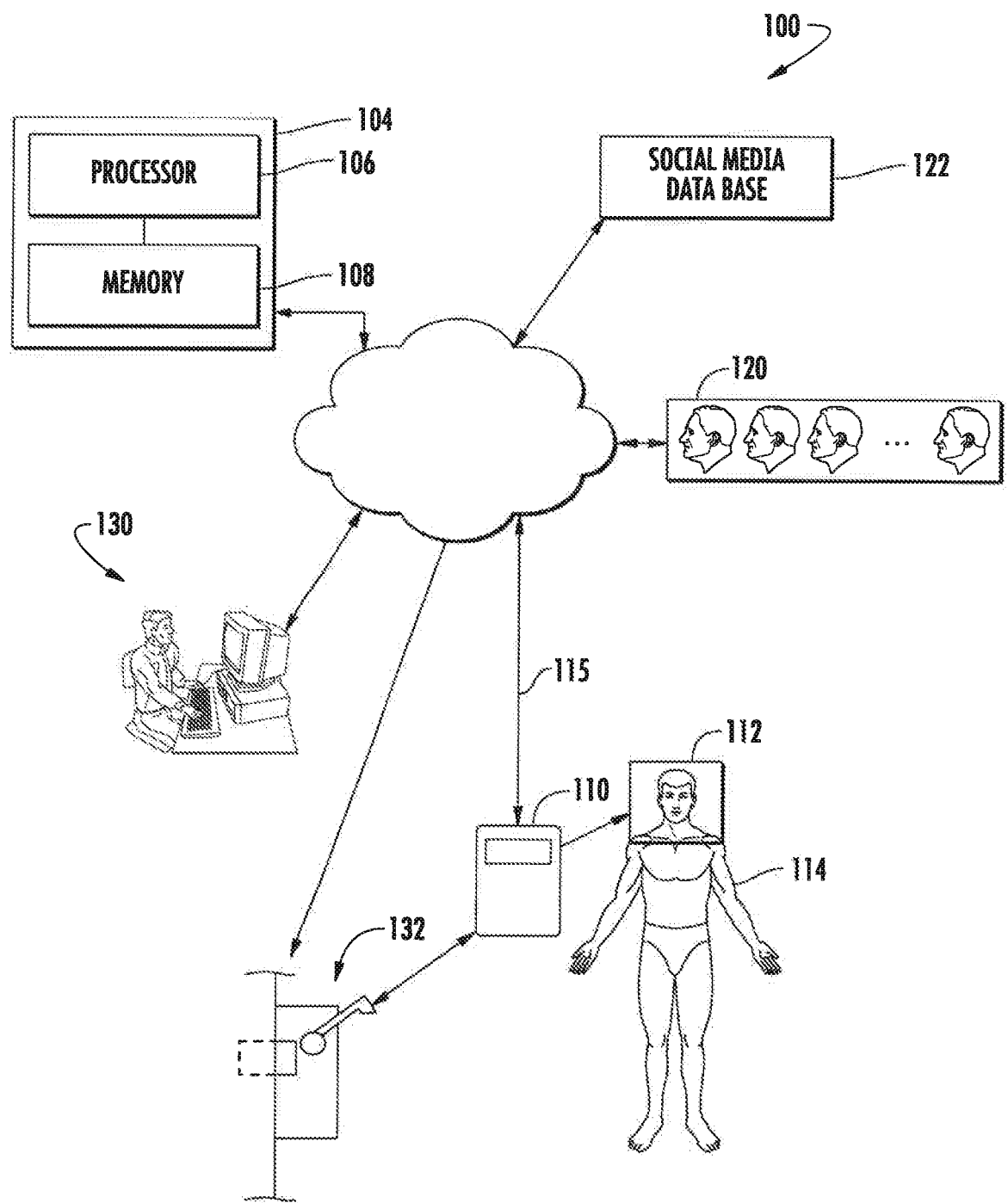
FIG. 1 is a schematic view of an exemplary embodiment of a system for access authentication constructed in accordance with the present disclosure, showing an authentication server in communication with a stored database and mobile device of a user.

Reference will now be made to the drawings wherein like reference numerals identify similar structural features or aspects of the subject disclosure. For purposes of explanation and illustration, and not limitation, a partial view of an exemplary embodiment of the systems and methods for access authentication in accordance with the disclosure is shown in FIG. 1 and is designated generally by reference character 100. Other embodiments of systems and methods for access authentication in accordance with the disclosure, or aspects thereof, are provided in FIG. 2, as will be described.

With reference to FIG. 1 a system 100 for access authentication of a user is shown. System 100 can be used to gain entry to a restricted area such as a hotel room, a house, an office building or the like. System 100 can also be used to gain operation control of a network or security system. System 100 includes a server 104 having a processor 106 and a memory 108. The processor 106 and memory 108 work in conjunction to allow access to the user based on received biometric data, e.g., facial recognition. More specifically, the memory 108 includes instructions recorded thereon that, when read by the processor 106, cause the processor 106 to receive a facial recognition picture from a mobile electronic apparatus 110 of a user 114. Prior to gaining access, the user 114 takes a facial recognition picture 112 using their mobile electronic device 110 and transmits the facial recognition picture 114 over a secure network 115. The processor 106 then compares the facial recognition picture 112 to a stored facial recognition picture of the user. Facial recognition picture is shown and described for ease of explanation, however, any type of authentication image can be used such as an image of a tattoo, scar, facial expression, or the like may be used to gain access without departing from the scope of the present disclosure.

The stored facial recognition picture can be retrieved from several different sources. For example, a stored picture database 120 can be created each time a user transmits a facial recognition picture 114. In addition, a social media account database 122, e.g., Facebook, can be searched to verify user identification. The social medial account database 122 can be used the first time the user attempts to gain access or the social media account database 122 can be used in addition to the stored picture database 120 to provide a second form of identification of the user. Any other suitable systems for storing and searching pictures to identify a user can be used.

With continued reference to FIG. 1, system further includes an access control administrator 130 for overseeing the system. The access control administrator 130 acts to oversee the system 100 and monitors scheduling of access to specific locking mechanisms 132. Once the processor 106 receives the transmitted facial recognition picture 112, the processor 106 makes several comparisons to verify authentication of the user 114. The processor 106 compares the transmitted facial recognition picture 112 of the user to a plurality of stored facial recognition pictures. After the processor 106 identifies the user 114, the processor 106 also compares the user 114 to an identification code of the restricted area. For example, if the user 114 is attempting to gain access to a hotel room, the processor 106 compares the user 114 to indicia of the room number and/or lock on the door of the hotel room. This provides additional securing by ensuring that the user identified is allowed to enter the specified room. Further, the processor 106 compares the transmitted facial recognition 112 with an identifier of the mobile electronic device 110. This provides further security by matching the user 114 with the mobile electronic device 110. If a positive identification is found between the transmitted facial recognition picture 112, the user 114 and the mobile electronic device 110 and between the user 114 and the restricted area, an authorization key is transmitted to the locking mechanism 132 of the restricted area e.g., a lock on a hotel room door. It will be understood by those skilled in the art the term locking mechanism can refer to a physical lock on a door or a lock on an electronic system, e.g., an electronic network.

Figure 2:
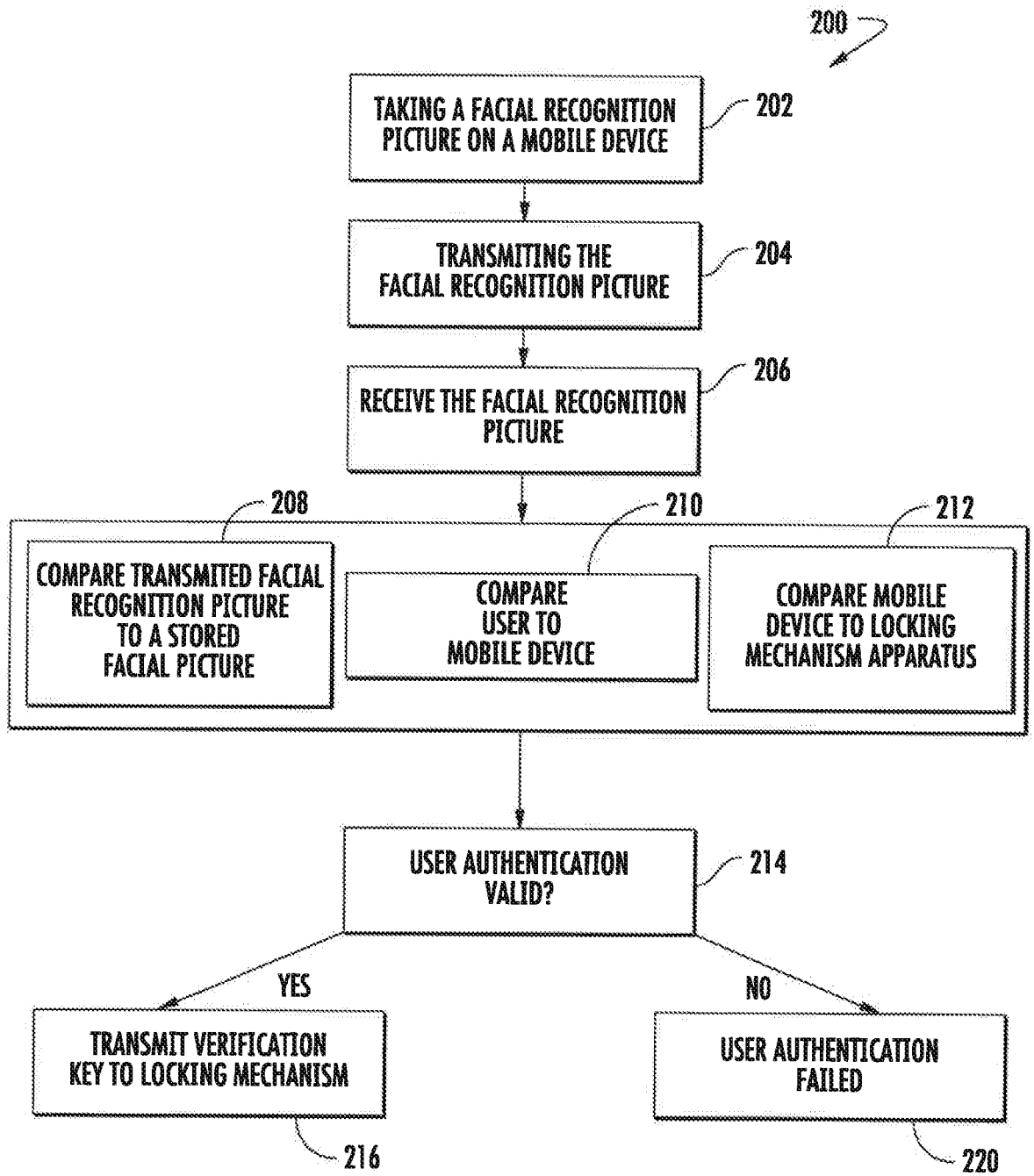
FIG. 2 is a flow chart showing an exemplary embodiment of a method for access authentication using the system of FIG. 1.

FIG. 2 illustrates a method 200 for performing access authentication. Prior to attempting to gain access and/or entry to a restricted space, a user, e.g., user 114, opens an application on a mobile electronic device, e.g., mobile electronic device 110. A locking mechanism, e.g., locking mechanism 132, is awakened and communicates with the mobile device. With the application on the mobile electronic device on, server, e.g., server 104, requests a picture of the user attempting to gain access. As shown in box 202, the user takes a facial recognition picture, e.g., facial recognition picture 112, using the mobile electronic device. The facial recognition picture may include a screen gesture such as a wink, a hand gesture such as displaying a peace sign, or a gesture such as the user sticking out his or her tongue. The facial recognition picture is then transmitted to the server as shown in box 204. In certain embodiments, the user may also enter a personal identification number.

The server receives the transmitted facial recognition picture, as shown in box 206. With reference to boxes 108, 210 and 212, respectively, a processor, e.g, processor 106, of the authentication server then compares the facial recognition picture to a plurality of stored facial recognition pictures. In addition, the processor compares the facial recognition picture to an identifier of the mobile electronic device. Further, the processor compares the transmitted facial recognition picture to an identifier of the restricted space. As shown in boxes 214 and 216, respectively, if comparisons return positive identification, authorization is transmitted to the locking mechanism of the restricted space and in turn the user gains access to the restricted space. If comparisons made by the processor return an invalid verification, then the user receives a notice that the user authentication has failed, as shown in box 220. In this manner the system and method for access authentication verifies in real time not only the user attempting to gain access but also matches the user with the mobile electronic device to provide additional security to the restricted space.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods and systems of the present disclosure, as described above and shown in the drawings, provide for systems and methods for access authentication with superior properties including verification using a facial recognition picture. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A computer-implemented method for access authentication comprising:
   receiving, in response to opening of an application for execution by a mobile electronic apparatus that awakens a locking mechanism for communicating with the mobile electronic apparatus, a transmitted digital facial recognition picture of a user from the mobile electronic apparatus, wherein the facial recognition picture was captured and transmitted by the mobile electronic apparatus;
   comparing in a first comparison the transmitted facial recognition picture to a stored digital facial recognition picture of the user;
   comparing in a second comparison the transmitted facial recognition picture to a digital identifier of the mobile electronic apparatus; and
   comparing in a third comparison the transmitted facial recognition picture to a digital identifier of a restricted space to which access is protected by the locking mechanism or to a digital identifier of the locking mechanism,
   wherein a digital authorization key signal is transmitted to the locking mechanism upon a positive result of the first, second, and third comparisons to actuate the locking mechanism for allowing access to the restricted space.

2. The method of claim 1, wherein comparing in the first comparison includes comparing the transmitted facial recognition picture to a plurality of facial recognition pictures stored on a picture database.

3. The method of claim 2, wherein the picture database is populated by each transmitted facial recognition picture.

4. The method of claim 1, wherein comparing in the first comparison includes comparing the transmitted facial recognition picture to a facial recognition picture of a social media account.

5. The method of claim 1, further comprising receiving a screen gesture from the mobile electronic apparatus of a user.

6. An access authentication system comprising:
   a processor operatively connected to a memory, wherein the memory includes instructions recorded thereon that, when read by the processor, cause the processor to:
   receive, in response to opening of an application for execution by a mobile electronic apparatus that awakens a locking mechanism for communicating with the mobile electronic apparatus, a transmitted digital facial recognition picture of a user from the mobile electronic apparatus, wherein the facial recognition picture was captured and transmitted by the mobile electronic apparatus;
   compare in a first comparison the transmitted facial recognition picture to a digital stored facial recognition picture of the user;
   compare in a second comparison the transmitted facial recognition picture to a digital identifier of the mobile electronic apparatus; and
   compare in a third comparison the transmitted facial recognition picture to a digital identifier of a restricted space to which access is protected by the locking mechanism or to a digital identifier of the locking mechanism,
   wherein a digital authorization key signal is transmitted to the locking mechanism upon a positive result of the first, second, and third comparisons to actuate the locking mechanism for allowing access to the restricted space.

7. The system of claim 6, further comprising a picture database populated by each transmitted facial recognition picture.

8. The system of claim 6, further comprising a social media database having a plurality of stored facial recognition pictures.

9. The system of claim 6, further comprising an access control administrator.

* * * * *